United States Patent
Teramura et al.

(10) Patent No.: US 12,496,502 B2
(45) Date of Patent: Dec. 16, 2025

(54) TABLE TENNIS RUBBER

(71) Applicant: TAMASU CO., LTD., Tokyo (JP)

(72) Inventors: Hiroki Teramura, Saitama (JP); Yuta Tsukiji, Saitama (JP)

(73) Assignee: TAMASU CO., LTD., Tokyo (JP)

( * ) Notice: Subject to any disclaimer, the term of this patent is extended or adjusted under 35 U.S.C. 154(b) by 0 days.

(21) Appl. No.: 18/706,546

(22) PCT Filed: Jan. 26, 2024

(86) PCT No.: PCT/JP2024/002329
§ 371 (c)(1),
(2) Date: May 1, 2024

(87) PCT Pub. No.: WO2025/022691
PCT Pub. Date: Jan. 30, 2025

(65) Prior Publication Data
US 2025/0032872 A1    Jan. 30, 2025

(30) Foreign Application Priority Data
Jul. 27, 2023 (JP) .................... 2023-122098

(51) Int. Cl.
*A63B 59/45* (2015.01)
*A63B 102/16* (2015.01)
(Continued)

(52) U.S. Cl.
CPC ............... *A63B 59/45* (2015.10); *B32B 3/30* (2013.01); *B32B 5/18* (2013.01); *B32B 7/12* (2013.01);
(Continued)

(58) Field of Classification Search
CPC . A63B 59/45; A63B 2102/16; A63B 2209/00; B32B 3/30; B32B 5/18;
(Continued)

(56) References Cited

U.S. PATENT DOCUMENTS

2012/0190485 A1* 7/2012 Aurbach .............. A63B 63/007
473/462

FOREIGN PATENT DOCUMENTS

JP      2004-89551      3/2004
JP      2004-97556      4/2004
(Continued)

OTHER PUBLICATIONS

Notice of Reason for Refusal issued Sep. 26, 2023 in Japanese Application No. 2023-122098, with English translation.
(Continued)

*Primary Examiner* — Jeffrey S Vanderveen
(74) *Attorney, Agent, or Firm* — Wenderoth, Lind & Ponack, L.L.P.

(57) ABSTRACT

A table tennis rubber includes a spongy sheet, and a rubber sheet layered and adhered to the spongy sheet with a plurality of protrusions defined on a sticking surface of a main body of the rubber sheet to the spongy sheet. The rubber sheet has a thickness of 1.6 mm or less in a layering direction on the spongy sheet. A value denoted as ar is an
(Continued)

area percentage (%) of the protrusions to the sticking surface of the main body of the rubber sheet. A value denoted as h is a height (mm) of the protrusions. A ratio denoted as ar/h is 52 or more.

11 Claims, 2 Drawing Sheets

(51) Int. Cl.
 *B32B 3/30* (2006.01)
 *B32B 5/18* (2006.01)
 *B32B 7/12* (2006.01)
 *B32B 25/04* (2006.01)
 *B32B 25/12* (2006.01)

(52) U.S. Cl.
 CPC ............ *B32B 25/045* (2013.01); *B32B 25/12* (2013.01); *A63B 2102/16* (2015.10); *A63B 2209/00* (2013.01); *B32B 2250/02* (2013.01); *B32B 2250/24* (2013.01); *B32B 2307/536* (2013.01); *B32B 2307/72* (2013.01); *B32B 2307/7376* (2023.05)

(58) Field of Classification Search
 CPC ......... B32B 7/12; B32B 25/045; B32B 25/12; B32B 2250/02; B32B 2250/24; B32B 2307/536; B32B 2307/72; B32B 2307/7376

See application file for complete search history.

(56) References Cited

FOREIGN PATENT DOCUMENTS

| | | | |
|---|---|---|---|
| JP | 2004-113568 | | 4/2004 |
| JP | 2004113568 A | * | 4/2004 |
| JP | 2005-21474 | | 1/2005 |
| JP | 2013-17651 | | 1/2013 |
| JP | 5609047 | | 10/2014 |
| JP | 2015-6790 | | 1/2015 |
| JP | 5947003 | | 7/2016 |
| JP | 2017-86358 | | 5/2017 |
| JP | 6738472 | | 8/2020 |
| JP | 2021-45449 | | 3/2021 |
| WO | 2013/008357 | | 1/2013 |
| WO | 2014-192516 | | 12/2014 |

OTHER PUBLICATIONS

International Search Report issued Apr. 16, 2024 in International (PCT) Application No. PCT/JP2024/002329.
Decision to Grant a Patent issued Dec. 20, 2023 in Japanese Application No. 2023-122098, with English translation.

* cited by examiner

TABLE TENNIS RUBBER

TECHNICAL FIELD

The present invention relates to a table tennis rubber for table tennis which is used while being adhered to a main body of a table tennis racket.

BACKGROUND ART

Generally, a table tennis rubber is composed of a spongy-like sheet and a rubber sheet adhered to the spongy-like sheet. In table tennis rackets, table tennis rubbers account for a large portion of their batting performance.

Specifically, for example, enhancement in speed performance (performance to give higher batted ball speed) and spin performance (performance to allow a player to put a spin on a ball with ease) is demanded for table tennis rubbers.

Accordingly, a plurality of rubbers differing in constituent members, surface shape, etc., has been proposed for the purpose of enhancing those performances, and what is called a pimples-in rubber is known as one of them.

The pimples-in rubber is composed of a spongy-like sheet and a rubber sheet layered on the spongy-like sheet, and a plurality of protrusions is formed on the sticking surface of the rubber sheet to the spongy-like sheet. The pimples-in rubber achieves increased spin performance with a planar batting surface that gives an increased ball contact area, and increased ball-control performance (performance to allow a player to more reliably bat a ball to a desired direction) with protrusions that are biting into the spongy-like sheet to lower the compression stiffness of the entire rubber, thereby giving longer ball contact time.

On the other hand, the pimples-in rubber tends to cause the loss of the energy of a ball because of the lowering of the resilience due to biting of protrusions into the spongy-like sheet in batting a ball. The energy loss results in lowered ball speed, thus being unpreferable.

In view of this, table tennis rubbers improved also in speed performance by adjusting the characteristics of a polymer as a material have been proposed. For example, rubbers for table tennis with the spin performance enhanced by blending a chemical having good resilience performance or by mixing a viscous substance in a rubber sheet have been previously proposed.

In addition, rubbers for table tennis with the speed performance enhanced by altering the shape of protrusions in a rubber sheet have been previously proposed.

The applicants have also filed an application for a table tennis rubber comprising: a spongy-like sheet; and a rubber sheet layered and adhered to the spongy-like sheet with a plurality of protrusions formed on the sticking surface of a main body of the rubber sheet to the spongy-like sheet (see JP 2013-17651 and JP 2021-45449).

SUMMARY OF INVENTION

Technical Problem

An object of the present invention is to provide a novel technique for a table tennis rubber that makes it easier to put a spin and is capable of giving higher batted ball speed.

Solution to Problem

From the viewpoint of degree of freedom in product design, additional options are demanded for techniques that give increased speed performance, spin performance, etc.

The present inventors diligently studied to find that increased speed performance and spin performance are achieved with a configuration in which the thickness of the rubber sheet and a value calculated by dividing the area percentage of the protrusions to the sticking surface by the height of the protrusions are each within a specific range, completing the present invention.

The summary of the present invention is as follows.

[1] A table tennis rubber including:
   a spongy-like sheet; and
   a rubber sheet layered and adhered to the spongy-like sheet with a plurality of protrusions formed on the sticking surface of a main body of the rubber sheet to the spongy-like sheet,
   wherein the rubber sheet has a thickness of 1.6 mm or less in a layering direction on the spongy-like sheet, and
   $ar/h$ is 52 or more, wherein ar denotes a value of the area percentage (%) of the protrusions to the sticking surface, and h denotes a value of the height (mm) of the protrusions.

[2] The table tennis rubber according to [1], wherein $ar/h$ is 55 or more.

[3] The table tennis rubber according to [1], wherein $ar/h$ is 60 or more.

[4] The table tennis rubber according to any one of [1] to [3], wherein the protrusions have a height of 0.7 mm or less.

[5] The table tennis rubber according to any one of [1] to [4], wherein the rubber sheet has a thickness of 1.5 mm or less in the layering direction on the spongy-like sheet.

[6] The table tennis rubber according to [5], wherein the rubber sheet has a thickness of 1.4 mm or less in the layering direction on the spongy-like sheet.

[7] A table tennis racket, wherein the table tennis rubber according to any one of [1] to [6] is adhered to a main body of the racket.

Advantageous Effects of Invention

The present invention can provide a novel technique for a table tennis rubber that makes it easier to put a spin and is capable of giving higher batted ball speed.

DESCRIPTION OF EMBODIMENTS

One of embodiments of the present invention will be described with the drawings in the following.

Figure 1:
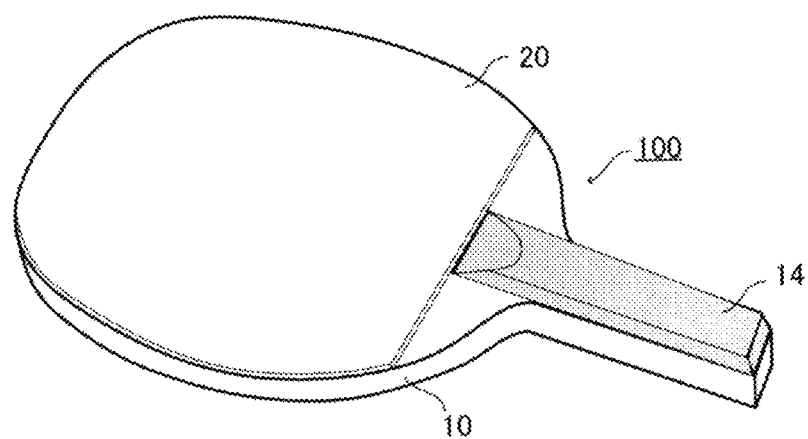
FIG. 1 is a perspective view of a table tennis racket in which a table tennis rubber of an embodiment of the present invention is adhered.

FIG. 1 is a perspective view of a table tennis racket 100 according to the present embodiment. As illustrated in FIG. 1, the table tennis racket 100 includes a blade 10 (a main body of the table tennis racket) and a table tennis rubber 20 adhered onto the blade 10.

The blade 10 is made of wood, and a handle 14 is fixed with an adhesive to a part of the blade to be held in use. Although a shakehand blade for double-sided batting is shown in the illustration, the shape of the blade in the present embodiment is not limited thereto, and the blade may be penhold one.

Figure 2:
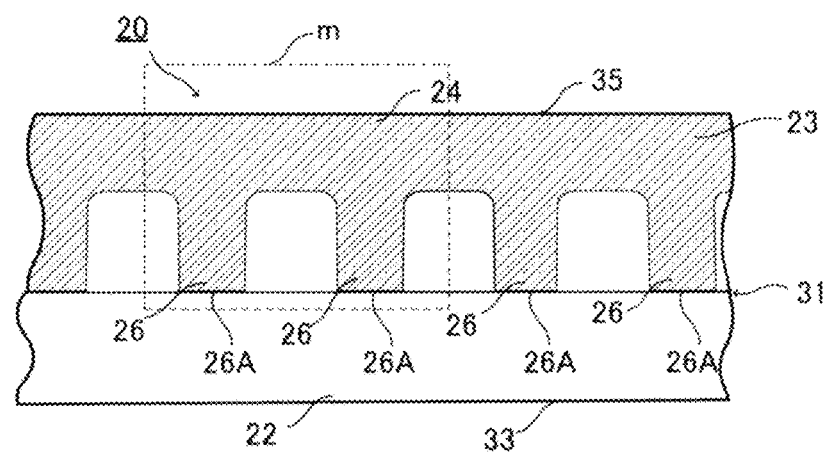
FIG. 2 is a cross-sectional view of a table tennis rubber of an embodiment of the present invention in the layering direction.

FIG. 2 is a cross-sectional view of the table tennis rubber 20 of the present embodiment in the layering direction. The table tennis rubber 20 of the present embodiment is what is called a pimples-in rubber, and includes a spongy-like sheet 22 and a rubber sheet 24 in the configuration. The spongy-like sheet 22 and the rubber sheet 24 are layered and adhered to each other to be integrated. A plurality of protrusions 26 is formed at specific intervals on the sticking surface of the rubber sheet 24 to the spongy-like sheet 22.

Each protrusion 26 has a generally cylindrical shape having an apex 261 that is visible as a generally circular shape in a front view from the sticking surface to the spongy-like sheet 22 (hereinafter, also referred to as "the front view", simply). The apexes 261 of the protrusions are facing and in contact with the spongy-like sheet 22, and the rubber sheet 24 is jointed to the spongy-like sheet 22 at the apexes 261 of the protrusions. It follows that the apexes 261 serve as contact surfaces of the protrusions 26 to the spongy-like sheet 22. An ITTF Technical Leaflet specifies that "Pimples must be evenly spaced along three sets of parallel lines at 60 degrees to each other". Also in the table tennis rubber of the present embodiment, the protrusions 26 can be evenly distributed on the sticking surface in the same arrangement as the specification states.

Herein, a region of the rubber sheet 24 other than the protrusions 26 is referred to as a rubber sheet main body 23.

A face 33 of the table tennis rubber 20 in the spongy-like sheet 22 side is pasted on the racket main body 10. A face 35 in the rubber sheet 24 side is used as a batting face to a ball.

The whole shape of each protrusion 26 is not limited, and may be the above-described generally cylindrical shape, or any other shape such as a generally truncated-conical shape, a shape such that a generally truncated-conical apex and a generally cylindrical shape are combined and integrated together, and a shape such that a generally cylindrical apex and a generally truncated-conical shape are combined and integrated together. The shape of the apex of each protrusion is not limited, and may be a circular shape or a polygonal shape such as a triangle and a rectangle.

A polymer is used for the spongy-like sheet 22, and examples thereof include, but are not limited to, common natural rubber, polyisoprene, polybutadiene, styrene-butadiene copolymers, acrylonitrile-butadiene copolymers, ethylene-propylene-diene copolymers, ethylene-propylene copolymers, polychloroprene, isobutylene-isoprene copolymers, styrene-based thermoplastic elastomers, and olefin-based thermoplastic elastomers. In particular, use of natural rubber, butadiene rubber, isoprene rubber, or the like is preferable for the production, and those skilled in the art can even select chemicals to be blended as appropriate. The spongy-like sheet may have any characteristics without limitation, and, for example, the density, the hardness, and the foam size may be 0.1 to 0.7 g/cm$^3$, 10 to 70 (as measured with an "ASKER Rubber Hardness Tester Type E" manufactured by KOBUNSHI KEIKI CO., LTD.), and 0.03 to 0.50 mm, respectively. To calculate the density of the spongy-like sheet 22, for example, the weight and the volume are measured and the measured weight is divided by the volume.

The hardness of the spongy-like sheet 22 can be measured, for example, in accordance with Standard Number JIS K 6253.

A polymer is used for the rubber sheet 24, similarly, and examples thereof include, but are not limited to, common natural rubber, polyisoprene, polybutadiene, styrene-butadiene copolymers, acrylonitrile-butadiene copolymers, ethylene-propylene-diene copolymers, ethylene-propylene copolymers, polychloroprene, isobutylene-isoprene copolymers, styrene-based thermoplastic elastomers, and olefin-based thermoplastic elastomers. In particular, use of natural rubber, butadiene rubber, isoprene rubber, or the like is preferable for the production, and those skilled in the art can even select chemicals to be blended as appropriate. The rubber sheet 24 may have any characteristics without limitation, and, for example, the density and the hardness may be 0.6 to 3.0 g/cm$^3$ and 20 to 65, respectively.

To calculate the density of the rubber sheet 24, for example, the weight is measured with an "Excellence XS analytical balance" manufactured by METTLER TOLEDO and the measured weight is divided by the volume.

To acquire a value of the hardness of the rubber sheet 24, for example, the rubber sheet is subjected to measurement with a "Micro durometer MD-1 Type A" manufactured by KOBUNSHI KEIKI CO., LTD. This durometer has a cantilever leaf spring for loading, and is capable of showing hardness as points ranging from 0 to 100. The spring load at 0 points corresponds to 22 mN and that at 100 points to 332 mN, and the indenter has a cylindrical form with dimensions of 0.16 mm in diameter and 0.5 mm in height. The range of hardness of 20 to 65 shown as an example in the present embodiment can also be expressed, for example, as a range of spring loads of 84.4 mN to 224.8 mN.

Figure 3:
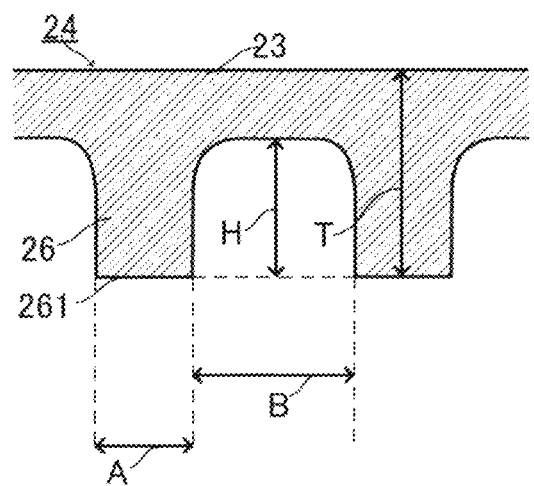
FIG. 3 is a cross-sectional view of a rubber sheet in a table tennis rubber of an embodiment of the present invention in the layering direction.

FIG. 3 is a diagram illustrating the region surrounded by the dashed line m in the rubber sheet 24 in the table tennis rubber 20 of the present embodiment in FIG. 2.

Here, the thickness T of the rubber sheet 24 in the layering direction on the spongy-like sheet 22 (hereinafter, also referred to as the thickness T or T, simply) is 1.6 mm or less. For improved speed performance and spin performance, the thickness T is preferably 1.5 mm or less, and more preferably 1.4 mm or less. The thickness T can also be calculated from the thickness of the rubber sheet main body 23 in the layering direction and the height of the protrusions described later.

In the present embodiment, ar/h is 52 or more, wherein ar denotes a value of the area percentage (%) of the protrusions to the sticking surface (hereinafter, also referred to as the area percentage ar or ar, simply), and h denotes a value of the height (mm) of the protrusions (hereinafter, also referred to as the height h of the protrusions or h, simply).

Herein, the area percentage of the protrusions to the sticking surface refers to a proportion as the area of parts of the protrusions 26 of the rubber sheet 24 in contact with the spongy-like sheet 22 per unit area. The area percentage ar can be determined by calculation. In the case that the apex of each protrusion has a circular shape, for example, the calculation can be done with the following expression.

$$ar = (A/2)^2 \times \pi \times 100/((A + B)^2 \times \sin(\pi/3))$$

ar: area percentage (%) of protrusions 26 to sticking surface
A: diameter (mm) of part of protrusion 26 in contact with spongy-like sheet (apex 261)
B: distance (mm) between two adjacent protrusions 26

The configuration with the thickness T being 1.6 mm or less and ar/h being 52 or more as described above gives increased speed performance and spin performance.

The value of ar/h is preferably 55 or more, and more preferably 60 or more because more improved speed performance and spin performance can be achieved.

The value of ar/h is not limited thereto, but preferably 130 or less.

The thickness T is not limited thereto similarly, but preferably 0.6 mm or more.

The height h of the protrusions is not limited thereto, but preferably 0.7 mm or less because more improved speed performance and spin performance can be achieved. The height h of the protrusions is not limited thereto, but preferably 0.45 mm or more.

Adjustment of the thickness T, the area percentage ar, and the height h of the protrusions in the rubber sheet 24 is not limited to particular methods, and those skilled in the art can appropriately set them, for example, by mold change.

Thus, according to the present embodiment, the table tennis rubber 20 is capable of exhibiting increased speed performance and spin performance by virtue of the configuration of the rubber sheet with the thickness T being 1.6 mm or less and ar/h being 52 or more.

Accordingly, table tennis rackets configured with the table tennis rubber 20 of the present embodiment allow users to achieve increased batted ball speed and to put a higher spin on a batted ball, although the degrees vary from user to user.

Examples

Hereinafter, the table tennis rubber of the present embodiment will be described in more detail with examples; however, the present invention is not limited to the examples in any way.

Rubber sheets with different thicknesses T, area percentages ar, and heights h of protrusions were produced by molding materials in formulations shown in Table 1 with an 8-inch mixing roll and a vulcanizing press. The production was in the following manner.

First, a metal mold was heated to 152° C., and materials were put in the metal mold and pressurized to 10 MPa. Subsequently, the pressure was applied for 471 seconds, and the resultant was then taken out of the metal mold, giving a rubber sheet.

TABLE 1

| Polymers/chemicals | Rubber sheet formulation 1 | Rubber sheet formulation 2 |
|---|---|---|
| Natural rubber | 100 | |
| Isoprene rubber | | 100 |
| Calcium carbonate *1 | 15 | 15 |
| Stearic acid | 1 | 1 |
| Zinc oxide | 5 | 5 |
| Sulfur *2 | 2.5 | 2.5 |
| Accelerator 1 *3 | 0.4 | 0.4 |
| Accelerator 2 *4 | 0.4 | 0.4 |
| Total | 124.3 | 124.3 |

(part by mass)
*1 Calcium carbonate: NEOLIGHT SA300 manufactured by Takehara Chemical Industrial Co., Ltd.
*2 Sulfur: precipitated sulfur "GOLDEN FLOWER" manufactured by Tsurumi Chemical Industry Co., Ltd.
*3 Accelerator 1: Nocceler DM-P manufactured by OUCHI SHINKO CHEMICAL INDUSTRIAL CO., LTD.
*4 Accelerator 2: ACCEL D manufactured by Kawaguchi Chemical Industry Co., LTD.

The resulting rubber sheets were each pasted on a spongy-like sheet derived from a natural rubber having a hardness and density shown in Table 2; thus, table tennis rubbers of examples and comparative examples were produced.

The table tennis rubbers were evaluated for speed performance and spin performance.

TABLE 2

| | Hardness | Density [g/cm$^3$] |
|---|---|---|
| Spongy-like sheet | 36 | 0.41 |

The hardness was measured with an Automated Rubber Hardness Tester P1 manufactured by KOBUNSHI KEIKI CO., LTD. The measurement method was in accordance with JIS K 6253.
The weight and the volume were measured, and the density was calculated by "weight/volume".

Specifically, evaluation was performed in the following procedure.

First, a rubber was adhered to a stage inclined so as to have a 45-degree slope with double-sided adhesive tape. Subsequently, a table tennis ball (manufacturer: Butterfly, product name: THREE STAR BALL R40+) was shot to the rubber with a table tennis machine. At that time, the ball speed and the ball spin rate were set to 11.0 m/s and 150 rps, respectively. The ball was filmed with a camera (manufacturer: nac Image Technology Inc., product name: MEMRECAM fx K4) from a moment immediately before the ball hit on the rubber to a moment immediately after that (specifically, 10 ms before and after the impact).

From the resulting movie, the ball speeds and the ball spin rates immediately before and after hitting on the rubber were calculated with analysis software (manufacturer: nac Image Technology Inc., software: LAA measurement). In addition, for the table tennis rubbers of examples and comparative examples, the "energy efficiency" of the batted ball was calculated from the determined ball speeds and ball spin rates immediately before and after hitting. Table 3 shows the results. Note that each "energy efficiency" shown was calculated as the mean for two filming results.

Each energy efficiency determined is a value indicating the power of the batted ball, and higher values of energy efficiency indicate that less energy is lost from the ball after being batted.

If the energy loss is small, the translational energy and rotational energy of the ball before being batted are efficiently transmitted, and hence higher batted ball speed is achieved. This results in, for example, easiness in driving and smashing at high speed.

If the energy loss is small, the translational energy and rotational energy of the ball before being batted are efficiently transmitted, and hence enhanced spin performance is also achieved. This results in, for example, easiness in driving, chopping, and serving with spinning.

Energy efficiency is calculated from the following expression.

$$\text{Energy efficiency (\%)} = \frac{\frac{1}{2}m(v_2)^2 + \frac{1}{2}I(\omega_2)^2}{\frac{1}{2}m(v_1)^2 + \frac{1}{2}I(\omega_1)^2} \times 100 \quad \text{[Expression 1]}$$

m: mass of ball (kg)
$v_1$: velocity of ball before impact (m/s)
$v_2$: velocity of ball after impact (m/s)
I: moment of inertia of ball (kg·m$^2$)
$\omega_1$: rotation of ball before impact (rad)
$\omega_2$: rotation of ball after impact (rad)

TABLE 3

| | Diameter of apex of protrusion (A, mm) | Distance between protrusions (B, mm) | Thickness of rubber sheet main body (mm) | Height of protrusions (h, mm) | Thickness of rubber sheet (T, mm) | Area percentage (ar, %) | ar/h | Energy efficiency for formulation 1 (%) | Energy efficiency for formulation 2 (%) |
|---|---|---|---|---|---|---|---|---|---|
| Comparative Example 1 | 1.80 | 1.330 | 0.50 | 0.90 | 1.40 | 30.0 | 33.3 | 35.50 | 35.84 |
| Comparative Example 2 | 1.80 | 1.330 | 0.50 | 0.70 | 1.20 | 30.0 | 42.8 | 37.09 | |
| Comparative Example 3 | 1.80 | 0.910 | 0.50 | 0.90 | 1.40 | 40.0 | 44.5 | 37.89 | 36.94 |
| Comparative Example 4 | 1.80 | 1.330 | 0.50 | 0.60 | 1.10 | 30.0 | 50.0 | 39.23 | |
| Example 1 | 1.80 | 0.624 | 0.50 | 0.90 | 1.40 | 50.0 | 55.6 | 39.77 | 37.64 |
| Example 2 | 1.80 | 0.910 | 0.50 | 0.70 | 1.20 | 40.0 | 57.2 | 39.88 | |
| Example 3 | 1.80 | 1.330 | 0.50 | 0.50 | 1.00 | 30.0 | 60.0 | 39.93 | 37.75 |
| Example 4 | 1.80 | 0.910 | 0.50 | 0.60 | 1.10 | 40.0 | 66.7 | 40.09 | |
| Example 5 | 1.80 | 0.624 | 0.50 | 0.70 | 1.20 | 50.0 | 71.4 | 40.18 | |
| Example 6 | 1.80 | 0.910 | 0.50 | 0.50 | 1.00 | 40.0 | 80.0 | 40.55 | 39.77 |
| Example 7 | 1.80 | 0.624 | 0.50 | 0.60 | 1.10 | 50.0 | 83.3 | 40.65 | |
| Example 8 | 1.80 | 0.624 | 0.50 | 0.50 | 1.00 | 50.0 | 100.0 | 41.25 | 41.21 |

It is understood from Table 3 that the table tennis rubbers of the examples, each having a configuration with the thickness T being 1.6 mm or less and ar/h being 52 or more, exhibited higher speed performance and spin performance.

REFERENCE SIGNS LIST

10: blade, 20: table tennis rubber, 22: spongy-like sheet, 24: rubber sheet, 26: protrusion, 100: table tennis racket

The invention claimed is:

1. A table tennis rubber comprising:
a spongy sheet; and
a rubber sheet layered and adhered to the spongy sheet with protrusions defined on a sticking surface of a main body of the rubber sheet to the spongy sheet,
wherein:
the rubber sheet has a thickness of 1.6 mm or less in a layering direction on the spongy sheet;
ar denotes a value of an area percentage (%) of the protrusions to the sticking surface of the main body of the rubber sheet;
h denotes a value of a height (mm) of the protrusions; and
ar/h is 55 or more.

2. The table tennis rubber according to claim 1, wherein ar/h is 60 or more.

3. The table tennis rubber according to claim 1, wherein the height of the protrusions is 0.7 mm or less.

4. The table tennis rubber according to claim 1, wherein the thickness of the rubber sheet is 1.5 mm or less in the layering direction on the spongy sheet.

5. A table tennis racket comprising:
the table tennis rubber according to claim 1; and
a main body,
wherein the table tennis rubber is adhered to the main body of the table tennis racket.

6. The table tennis rubber according to claim 1, wherein the rubber sheet does not include short fibers.

7. The table tennis rubber according to claim 1, wherein:
the rubber sheet has a flat surface on a side opposite to the protrusions; and
the flat surface is a batting face configured to contact a ball.

8. The table tennis rubber according to claim 1, wherein:
A denotes a diameter (mm) of a part of one of the protrusions in contact with the spongy sheet;
B denotes a distance (mm) between two of the protrusions that are adjacent to each other; and $$ar=(A/2)^2 \times \pi \times 100/((A+B)^2 \times \sin(\pi/3)).$$

9. The table tennis rubber according to claim 8, wherein B is 0.9 or less.

10. The table tennis rubber according to claim 8, wherein B is 0.7 or less.

11. The table tennis rubber according to claim 1, wherein the rubber sheet is a polymer sheet which is free of fibers.

* * * * *